United States Patent [19]
Ostwald

[11] 3,865,440
[45] Feb. 11, 1975

[54] A HYDRAULIC BRAKING SYSTEM WITH A PLURALITY OF BOOSTER CONTROL VALVES CONNECTED IN SERIES

[75] Inventor: Fritz Ostwald, Buchschlag, Germany

[73] Assignee: ITT Industries, Inc., New York, N.Y.

[22] Filed: June 11, 1973

[21] Appl. No.: 369,019

[30] Foreign Application Priority Data
July 28, 1972 Germany............................ 2237030

[52] U.S. Cl. ........... 303/21 F, 188/181 A, 303/6 R, 303/10
[51] Int. Cl. .......................... B60t 8/06, B60t 13/12
[58] Field of Search....................... 303/21 F, 61–63, 303/68–69, 10, 6 R; 188/181 A

[56] References Cited
UNITED STATES PATENTS

| | | | |
|---|---|---|---|
| 3,606,488 | 9/1971 | Beuchle et al...................... | 303/21 F |
| 3,667,816 | 6/1972 | Harned.............................. | 303/21 F |
| 3,674,320 | 7/1972 | Howard et al................. | 188/181 A |
| 3,677,608 | 7/1972 | Lewis............................... | 188/181 A |
| 3,718,375 | 2/1973 | Bowler et al. ...................... | 303/21 F |
| 3,727,986 | 4/1973 | Koivunen............................. | 303/10 |
| 3,743,363 | 7/1973 | Hodge et al. ....................... | 303/21 F |
| 3,756,664 | 9/1973 | Schlitz et al....................... | 303/21 F |

*Primary Examiner*—Trygve M. Blix
*Assistant Examiner*—D. C. Butler
*Attorney, Agent, or Firm*—John T. O'Halloran; Menotti J. Lombardi, Jr.; Alfred C. Hill

[57] ABSTRACT

A hydraulic boosting system employs one pump and one reservoir or tank to control a brake booster, a power steering system and an antiskid hydraulic control device. The pump and reservoir are connected in series with a bypass flow governor, a brake booster control valve and a power steering control valve. The antiskid hydraulic control device in the form of a double acting plunger is connected in parallel to the bypass flow governor to provide the required difference of pressure on opposite sides of the double acting plunger.

9 Claims, 2 Drawing Figures

A HYDRAULIC BRAKING SYSTEM WITH A PLURALITY OF BOOSTER CONTROL VALVES CONNECTED IN SERIES

BACKGROUND OF THE INVENTION

The present invention relates to a hydraulic boosting system with one or more control valves connected in series and controlling servo cylinders.

The number of the units in modern motor vehicles which require a servo force is continually increasing. At present, servo brakes and servo steering systems have already won wide recognition, and antiskid systems for vehicular brakes normally depending on an additional power source is also finding more and more application.

In order to use but one pump for several boosting circuits it is possible to connect a control valve for a servo steering system and a control valve for a servo brake in series and is disclosed in German Pat. No. 1,129,830 so that there will be a circulation of the pressure or hydraulic medium from the pump through both control valves to the return tank or reservoir. In this arrangement, however, a certain dimensioning of the reaction surfaces of both control valves in relation to the effective piston surfaces of the respective servo motor is required in order to avoid a mutual coupling or influence of the individual units.

SUMMARY OF THE INVENTION

The object of the present invention is to combine an antiskid system with a hydraulic boosting system such as is disclosed in German Pat. No. 1,129,830 so that both systems can be supplied by the single pump of the boosting system.

A feature of the present invention is the provision of a hydraulic boosting system comprising: a hydraulic pump; a hydraulic medium reservoir its output coupled to an input of the pump; $n$ hydraulic boosting control valves coupled in series with each other and an output of the pump and an input of the reservoir, where $n$ is an integer including one; the pump, the reservoir and the control valves providing a primary series hydraulic medium circulation; and at least one hydraulic control device for an antiskid system connected in parallel to the primary circulation at two points therein having two different pressures. Another feature of the present invention is the provision of a double-acting plunger for the hydraulic control device of the antiskid system.

A further feature of this invention is the provision that the double-acting plunger is connected either to the inlet and the control-valve-side output of a by-pass flow governor or to the inlet and outlet of a brake booster control valve.

Because of this inventive arrangement the pressure difference normally resulting at the by-pass flow governor or at the brake booster control valve is used to provide the hydraulic control of the antiskid system. The performance obtained at the double-acting plunger can be stored by means of a spring in a manner known per se.

The inventive connection of the double-acting plunger to a pressure difference basically enables the same effects as are gained from unilateral actuation of a piston whose other side is acted upon by the always constant atmospheric pressure such as is the case, for instance, in accumulator systems. The advantage, however, lies in the essential technical simplifications as well as in cost saving, since the accumulator with the loading valve, the pressure level indication system and the additional high-pressure pump can be dispensed with. Finally, there is the advantage of operating at a lower pressure level in comparison to accumulator systems. This lower pressure is normal with regard to circulatory booster systems and results in low weights and low costs with respect to the components. Further, there are no sealing problems. The entire set of "seat-valve problems" does not apply.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
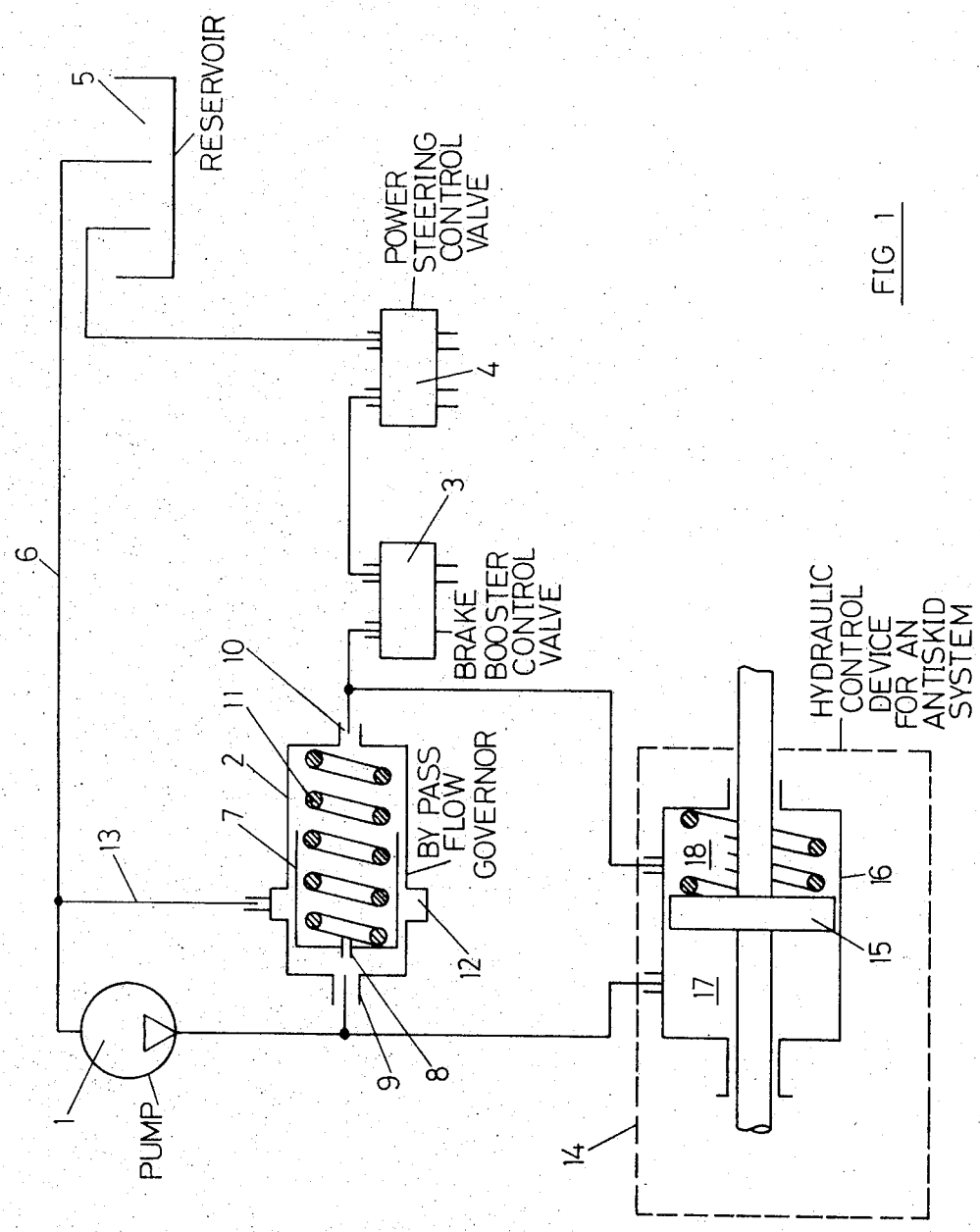
FIG. 1 is a schematic representation of the hydraulic boosting system in accordance with the principles of the present invention.

Referring to FIG. 1 the hydraulic boosting system of the present invention includes a pump 1 which supplies liquid (hydraulic medium) through a by-pass governor 2, through a brake booster control valve 3, through a sero or power steering control valve 4 and, hence, to a tank or reservoir 5. From reservoir 5 the pressure or hydraulic medium is returned to pump 1 via a line 6.

As usual, by-pass flow governor 2 is provided with a control piston 7 having a throttling point 8. The pressure medium is fed into by-pass flow governor 2 through an inlet 9 and is discharged via an outlet 10, the flow then being practically constant. A pressure spring 11 moves the control piston 7 towards inlet 9 so that in the rest position the control piston 7 blocks an annular chamber 12 from which a line 13 leads directly to line 6.

When pump 1 is operated a more or less constant flow will be circulated through throttling point 8 to control valves 3 and 4. The amount of pressure medium supplied by the pump 1 in excess to said constant flow will displace control piston 7 against the force of spring 11 towards outlet 10. This displacement of piston 7 will open up annular chamber 12 and permit the excess pressure medium to return to pump 1 via line 13.

FIG. 1 further schematically illustrates a hydraulic control device 14 for an antiskid system in the form of a double-acting plunger 15 which is movable in a cylinder 16, working chambers 17 and 18 are formed. According to this invention, working chamber 17 is connected with inlet 9 of by-pass flow governor 2 while working chamber 18 is connected with the control-valve-side outlet 10 of by-pass flow governor 2.

It is now assumed that both control valves 3 and 4 as well as device 14 are not operating. In this event a constant flow passes through throttling point 8 of by-pass flow governor 2, passes the two control valves 3 and 4 unthrottled, and enters tank 5 from where it will be return to pump 1 via line 6. According to the amount of flow supplied by the pump, which depends on the speed of the pump, a pressure before control piston 7 will be built up which will displace control piston 7 against the force of spring 11 and which will cause part of the supplied pressure medium to directly return to pump 1 via annular chamber 12 and line 13. Upon operation of the brake, part of the pump flow will be supplied from control valve 3 to the nonillustrated servo cylinder of the brake. The pressure prevailing between pump 1 and control valve 3 will then increase to the extent that also the two working chambers 17 and 18 of cylinder 16 of the antiskid hydraulic control device will be applied with a higher pressure. Since, however, the pressure on both sides of by-pass flow governor 2 will evenly increase and since the pressure difference will always be determined by the action of throttle 8 in connection with the release of the by-pass (chamber 12) there will be in the antiskid control device 14 only a change in the pressure levels of the two individual pressures, not a change in the difference of the pressures prevailing in the two working chambers 17 and 18 with regard to each other.

The above explanations will also apply if the other control valve 4 is operated or if there is a simultaneous operation of both control valves 3 and 4.

If the antiskid control is in operation during a braking action pressure will act on the two working chambers 17 and 18 due to the throttling of the flow caused by the throttle 8 of by-pass flow governor 2. By means of nonillustrated control devices it will then be possible to relieve one of the working chambers 17 and 18 so that the desired volume change of the brake system is brought about in the known manner. It is possible to store the performance at plunger 15 in the known manner by means of a spring. For further explanation reference is made to FIG. 2 in which operationally like parts are indicated by the same reference numerals as used in FIG. 1.

FIG. 2 again illustrates a pump 1, a by-pass flow governor 2, a brake booster control valve 3 and a tank or reservoir 5. For the sake of clarity the power steering control valve illustrated in FIG. 1 has been left out of this illustration. When the brake is not operated the pressure medium supplied by pump 1 circulates in the known manner through by-pass flow governor 2 and control valve 3 back into tank 5. From the outlet 10 of by-pass flow governor 2 a line is branched off and leads to a slide valve 19. In the illustrated position of slide valve 19 the pressure medium line branched off from outlet 10 is circulated to working chamber 18 of cylinder 16 while a line which is branched off before slide valve 19 circulates pressure medium to working chamber 17 of cylinder 16. This arrangement ensures pressure compensation of plunger 15 and keeps it in a position enforced by a spring 20. If the plunger is to be displaced in another position at first slide valve 19 will be moved into its other position by means of a signal of the non-illustrated sensor of the electronic circuit of an antiskid system. As a result, the pressure medium will be directly circulated from pump 1 into working chamber 18 of cylinder 16 via slide valve 19. As described above, working chamber 17 communicates with outlet 10 of by-pass flow governor 2 and, thus, also with tank 5 via control valve 3. Thereby it is possible for the pressure supplied by pump 1 to displace plunger 15 to the left while the pressure medium contained in working chamber 17 can be discharged into tank 5 via control valve 3.

Figure 2:
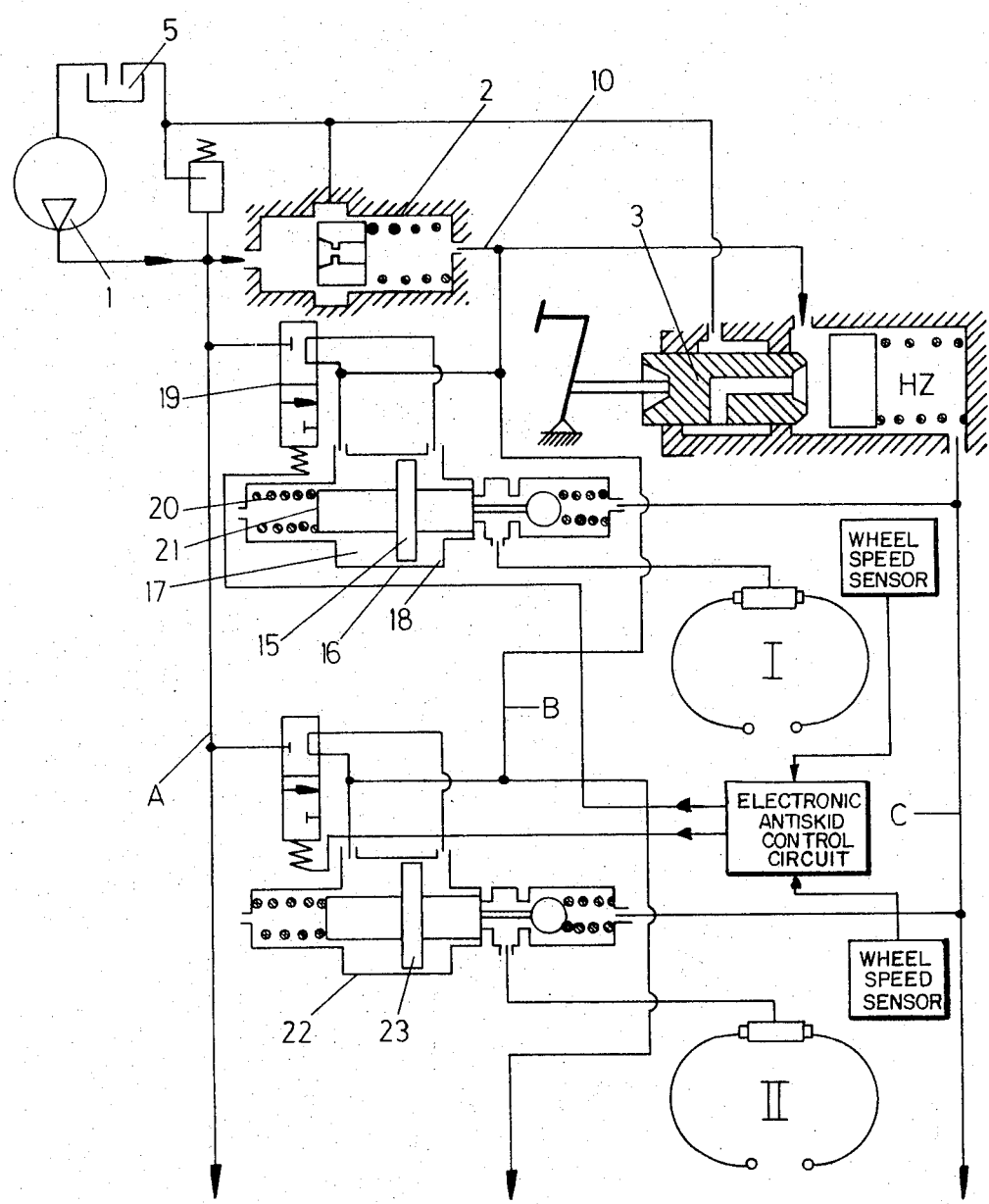
FIG. 2 is a detailed connection diagram of the inventive boosting system of FIG. 1.

Further, FIG. 2 illustrates that it is possible to connect another cylinder 22 with a plunger 23 in the same manner and in parallel with the first cylinder 16. This arrangement enables easy supply to the hydraulic control devices of an antiskid systems involving all vehicular wheels from one sole pump.

For the sake of completeness it should be further mentioned that further antiskid hydraulic control devices for other vehicular wheels can be connected between the supply lines A and B. Then, a corresponding line C would lead to the respective vehicular brakes.

A second embodiment of the invention is not illustrated in the drawing. Said second embodiment differs from the above-described embodiment only in that plunger 15 is connected to the inlet and outlet of a control valve which controls the brake booster. Due to this arrangement there results a pressure difference between the booster inlet and the booster outlet upon the actuation of the brake and, hence, upon the actuation of the brake booster, which pressure difference is used for performing the hydraulic control for an antiskid system.

While I have described above the principles of my invention in connection with specific apparatus is to be clearly understood that this description is made only by way of example and not as a limitation to the scope of my invention as set forth in the objects thereof and in the accompanying claims.

I claim:
1. a hydraulic boosting system comprising:
   a hydraulic pump having an input and an output;
   a hydraulic medium reservoir having an input and an output directly connected to said input of said pump;
   $n$ hydraulic boosting control valves each having an input and an output, said output of one of said control valves being directly connected to said input of an adjacent one of said control valves to connect said control valves in series with each other, where $n$ is an integer including one, said output of a last of said control valves being directly connected to said input of said reservoir to place said reservoir in series with said control valves and said input of said pump;
   a by-pass flow governor having an input directly connected to said output of said pump and a control-valve-side output directly connected to said input of a first of said control valves to place said pump and said governor in series with said control valves and said reservoir; and
   at least one hydraulic control device for an antiskid system directly connected to said input and said output of said governor to place said control device in parallel with said governor.
2. A system according to claim 1, wherein said control device includes a double-acting plunger.
3. A system according to claim 1, wherein said control valves include a brake booster control valve, and a power steering control valve.
4. A system according to claim 1, wherein said control valves include a brake booster control valve.
5. A system according to claim 1, wherein said control device includes a double-acting plunger; and said control valves include a brake booster control valve, and a power steering control valve.
6. A system according to claim 1, wherein said control device includes a double-acting plunger; and said control valves include a brake booster control valve.

7. A system according to claim 1, wherein a plurality of said control devices are directly connected in parallel with respect to each other and in parallel with said governor.

8. A system according to claim 7, wherein each of said control devices includes a double-acting plunger.

9. A system according to claim 8, wherein said double-acting plungers are connected in parallel with respect to each other and to said input and said output of said governor.

* * * * *